(12) United States Patent
Xue et al.

(10) Patent No.: US 10,845,098 B2
(45) Date of Patent: Nov. 24, 2020

(54) AIR CONDITIONER

(71) Applicant: Hitachi-Johnson Controls Air Conditioning, Inc., Tokyo (JP)

(72) Inventors: Jun Xue, Tokyo (JP); Koji Naito, Tokyo (JP); Hiroaki Kaneko, Tokyo (JP); Gen Yasuda, Tokyo (JP)

(73) Assignee: HITACHI-JOHNSON CONTROLS AIR CONDITIONING, INC., Tokyo (JP)

( * ) Notice: Subject to any disclaimer, the term of this patent is extended or adjusted under 35 U.S.C. 154(b) by 88 days.

(21) Appl. No.: 15/983,243

(22) Filed: May 18, 2018

(65) Prior Publication Data

US 2018/0340714 A1 Nov. 29, 2018

(30) Foreign Application Priority Data

May 26, 2017 (JP) .................................. 2017-104460

(51) Int. Cl.
*F25B 13/00* (2006.01)
*F25B 17/06* (2006.01)
(Continued)

(52) U.S. Cl.
CPC .............. *F25B 13/00* (2013.01); *F25B 49/02* (2013.01); *F25B 49/022* (2013.01);
(Continued)

(58) Field of Classification Search
CPC ........ F25B 13/00; F25B 49/02; F25B 49/022; F25B 17/067; F25B 2400/19;
(Continued)

(56) References Cited

U.S. PATENT DOCUMENTS 9,488,399 B2 * 11/2016 Kanazawa ............... F25B 13/00
10,001,309 B2 * 6/2018 Tanaka .................... F25B 45/00
(Continued)

FOREIGN PATENT DOCUMENTS

CN 102829582 A 12/2012
CN 104457054 A 3/2015
(Continued)

OTHER PUBLICATIONS

Chinese Office Action received in corresponding Chinese Application No. 201810480723.4 dated Mar. 16, 2020.

*Primary Examiner* — Marc E Norman
*Assistant Examiner* — Heather J Huddle
(74) *Attorney, Agent, or Firm* — Mattingly & Malur, PC

(57) ABSTRACT

An air conditioner is provided, which is capable of accurately determining appropriateness of a refrigerant amount in a refrigerating cycle. A control apparatus is configured to: stop a cooling operation; set an expansion valve to a fully-closed state and, at the same time, switch the selector valve to change the direction, in which a refrigerant flows, to an opposite direction; operate a compressor to perform a refrigerant recovery operation, in which a refrigerant contained in an outdoor heat exchanger is recovered by an indoor heat exchanger; and determine the appropriateness of a refrigerant amount in a refrigerating cycle, based on at least one of a time required for recovering the refrigerant, a pressure change in a refrigerant suctioned by the compressor, and temperature of the refrigerant discharged from the compressor during the refrigerant recovery operation.

6 Claims, 12 Drawing Sheets

→ During cooling operation
--▶ During heating operation, during refrigerant recovery operation

(51) Int. Cl.
*F25B 49/02* (2006.01)
*F25D 17/06* (2006.01)
*F24F 11/30* (2018.01)

(52) U.S. Cl.
CPC ............ *F25D 17/067* (2013.01); *F24F 11/30* (2018.01); *F25B 2313/0314* (2013.01); *F25B 2313/0315* (2013.01); *F25B 2400/19* (2013.01); *F25B 2500/222* (2013.01); *F25B 2500/23* (2013.01); *F25B 2500/24* (2013.01); *F25B 2600/01* (2013.01); *F25B 2600/0253* (2013.01); *F25B 2600/2513* (2013.01); *F25B 2700/1931* (2013.01); *F25B 2700/1933* (2013.01); *F25B 2700/21151* (2013.01); *F25B 2700/21152* (2013.01)

(58) Field of Classification Search
CPC ...... F25B 2500/222; F25B 2700/21151; F25B 2600/2513; F25B 2313/0315; F25B 2700/1931; F25B 2600/01; F25B 2600/0253; F25B 2700/21152; F25B 2500/24; F25B 2313/0314; F25B 2700/1933; F25B 2500/23; F25D 17/067; F24F 11/30; F24F 5/001; F24F 1/0003; F24F 11/61; F24F 11/86; F24F 11/64; F24F 11/84
See application file for complete search history.

(56) References Cited

U.S. PATENT DOCUMENTS 10,168,087 B2 * 1/2019 Munk ..................... F25B 45/00
10,302,342 B2 * 5/2019 Vaisman ................. F25B 45/00

FOREIGN PATENT DOCUMENTS

| JP | 07-004796 A | 1/1995 | |
| JP | H074796 * | 1/1995 | ............. F25B 49/02 |
| JP | 07-21374 B2 | 3/1995 | |
| JP | 10-176877 A | 6/1998 | |
| JP | 2011-106714 A | 6/2011 | |

* cited by examiner

→ During cooling operation
---▶ During heating operation, during refrigerant recovery operation → During cooling operation
--▶ During heating operation, during refrigerant recovery operation → During cooling operation
--▶ During heating operation, during refrigerant recovery operation

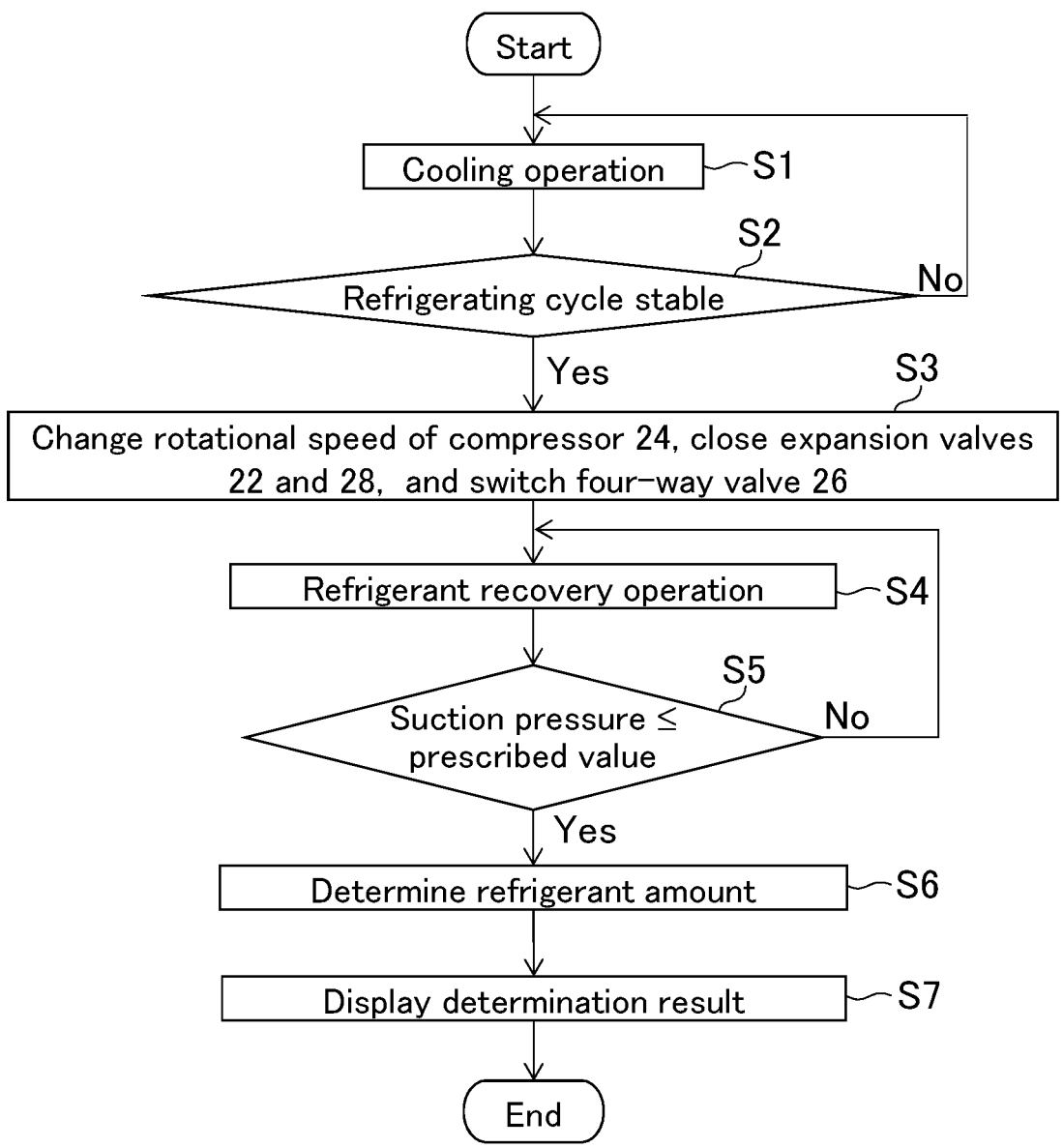

US 10,845,098 B2

AIR CONDITIONER

CROSS REFERENCE TO RELATED APPLICATION

This application claims priority from Japanese Patent Application No. 2017-104460 filed May 26, 2017. The entire content of the priority application is incorporated herein by reference.

TECHNICAL FIELD

The present disclosure relates to an air conditioner provided with means for determining appropriateness of a refrigerant amount in a refrigerating cycle.

BACKGROUND

Various methods are proposed for refrigerant amount determination of an air conditioner. For example, in conventional art disclosed in Japanese Patent Application Publication No. 2011-106714, one or both of an inlet refrigerant density and an outlet refrigerant density of pressure reducing means provided between a heat source-side heat exchanger and a throttle apparatus are calculated based on differential pressure between in front of and behind the pressure reducing means and a refrigerant circulation amount, and appropriateness of a refrigerant amount is determined based on calculated refrigerant density.

SUMMARY

However, with the conventional art described in Japanese Patent Application Publication No. 2011-106714, when a degree of supercooling at an outlet of the heat source-side heat exchanger cannot be acquired, accuracy of the refrigerant amount determination declines since inlet/outlet refrigerant densities of the pressure reducing means cannot be accurately calculated. In addition, when an anomaly occurs in an expansion valve, the likelihood of making an erroneous determination further increases.

An object of the present disclosure provides an air conditioner capable of more accurately determining the appropriateness of a refrigerant amount in a refrigerating cycle.

In order to achieve the object described above, an air conditioner according to one or more embodiments includes: a refrigerating cycle including a compressor, an outdoor heat exchanger, an indoor heat exchanger, a pressure reducing valve provided between the outdoor heat exchanger and the indoor heat exchanger, and a selector valve configured to implement switching between directions in which a refrigerant discharged from the compressor flows; and a control unit configured to control the refrigerating cycle, wherein the control unit is configured to: stop a cooling operation or a heating operation; set the pressure reducing valve to a fully-closed state and, at the same time, set the selector valve to change the direction, in which the refrigerant flows, to an opposite direction; operate the compressor to perform a refrigerant recovery operation, in which a refrigerant contained in one of the outdoor heat exchanger and the indoor heat exchanger is recovered by the other of the outdoor heat exchanger and the indoor heat exchanger; and determine appropriateness of a refrigerant amount in the refrigerating cycle, based on at least one of a time required for recovering the refrigerant, a pressure change in the refrigerant suctioned by the compressor, and temperature of the refrigerant discharged from the compressor during the refrigerant recovery operation.

BRIEF DESCRIPTION OF THE DRAWINGS

In the drawings:

FIG. 12 is a flow chart of a test run for determining appropriateness of a refrigerant amount in a refrigerating cycle according to the third embodiment.

DETAILED DESCRIPTION

Air conditioners according to some embodiments will be described with reference to the drawings.

First, an air conditioner 900 according to a first embodiment will be described with reference to FIG. 1.

Figure 1:
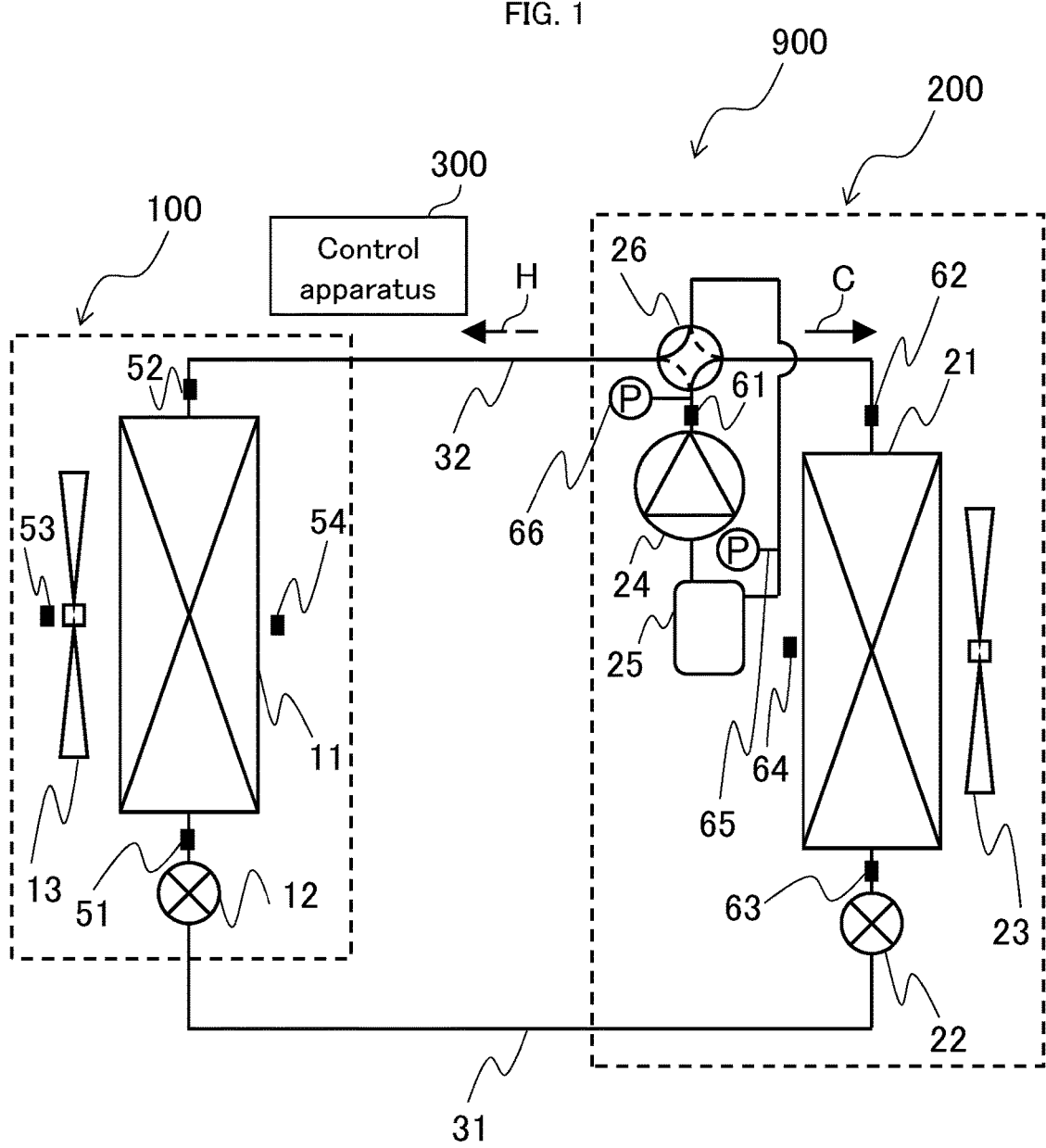
FIG. 1 is a cycle system diagram of an air conditioner according to a first embodiment.

FIG. 1 is a cycle system diagram of the air conditioner 900 according to the first embodiment.

The air conditioner 900 is provided with an indoor unit 100, an outdoor unit 200, pipes 31 and 32 which couple the indoor unit 100 and the outdoor unit 200 to each other, and a control apparatus 300.

The indoor unit 100 is provided with an indoor heat exchanger 11 which exchanges heat between a refrigerant and indoor air, an indoor expansion valve 12 which reduces pressure of the refrigerant, and an indoor fan 13 which supplies indoor air to the indoor heat exchanger 11.

The outdoor unit 200 is provided with an outdoor heat exchanger 21 which exchanges heat between a refrigerant and outside air, an outdoor expansion valve 22 which reduces pressure of the refrigerant, an outdoor fan 23 which supplies outside air to the outdoor heat exchanger 21, a compressor 24 which compresses the refrigerant, an accumulator 25 which separates and stores a liquid refrigerant not evaporated by an evaporator, and a four-way valve 26 which switches flow directions of the refrigerant.

Figure 3:
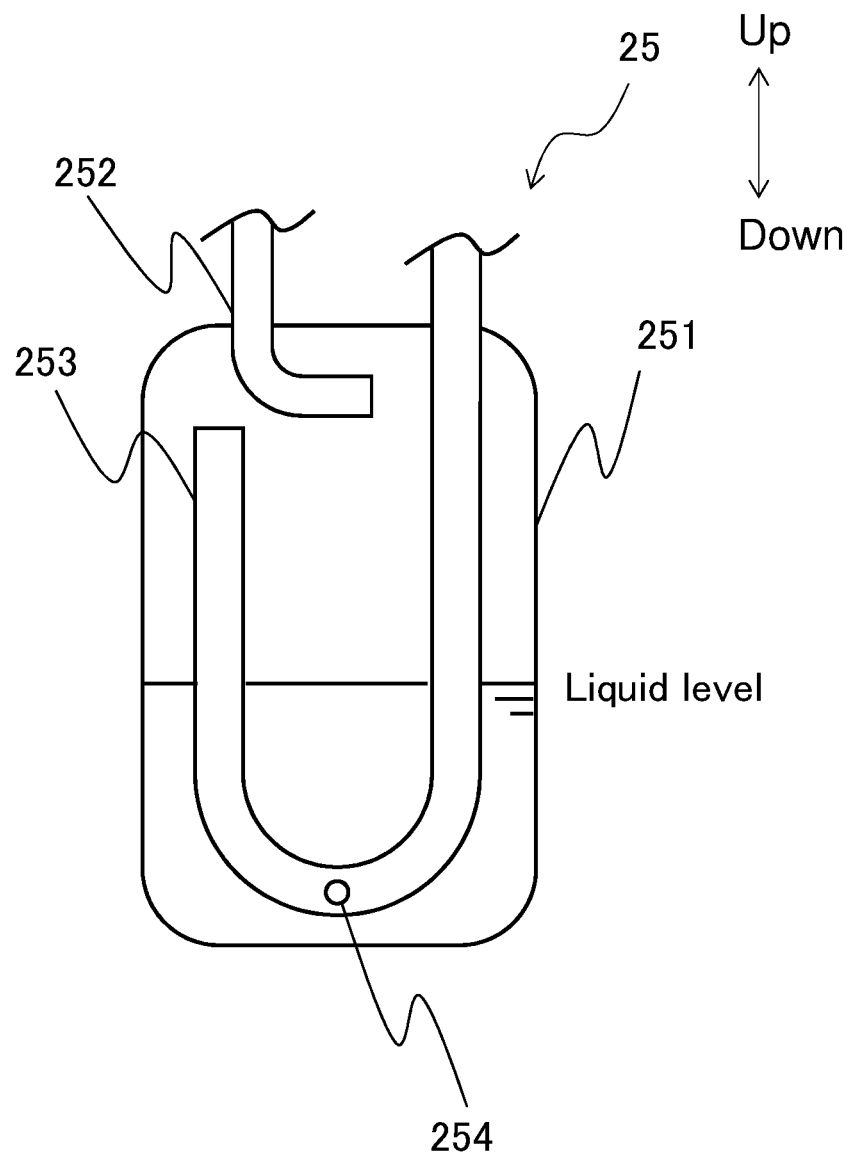
FIG. 3 is a schematic view of an accumulator.

For example, as shown in FIG. 3, the accumulator 25 is provided with a body 251, an L-tube 252, and a U-tube 253. The body 251 is a cylindrical sealed container which is capable of storing a refrigerant and refrigerant oil. In the L-tube 252, an upper end part arranged outside the body 251 is coupled to a pipe (not shown) which connects to the four-way valve 26, and a lower end part is opened in a horizontal direction in an upper part inside the body 251. In the U-tube 253, one end part is arranged outside the body and coupled to a suction pipe (not shown) of the compressor 24, and another end part is opened vertically upward in the upper part inside the body 251. In addition, a hole 254 is formed in a lower part of the U-tube 253.

Furthermore, various sensors are provided in order to gather information necessary for controlling the air conditioner 900.

Specifically, the indoor unit 100 is provided with temperature sensors 51 and 52 which detect refrigerant temperature before and after the refrigerant passes through the indoor heat exchanger 11, a temperature sensor 53 which detects indoor temperature, and a temperature sensor 54 which detects temperature of air which is blown indoors after being subjected to temperature adjustment.

In addition, the outdoor unit 200 is provided with a pressure sensor 66 which detects pressure (hereinafter, discharge pressure) of a refrigerant discharged from the compressor 24, a pressure sensor 65 which detects pressure (hereinafter, suction pressure) of a refrigerant suctioned by the compressor 24, a temperature sensor 61 which detects temperature of a refrigerant discharged from the compressor 24, temperature sensors 62 and 63 which detect refrigerant temperature before and after the refrigerant passes through the outdoor heat exchanger 21, and a temperature sensor 64 which detects outside air temperature.

Figure 2:
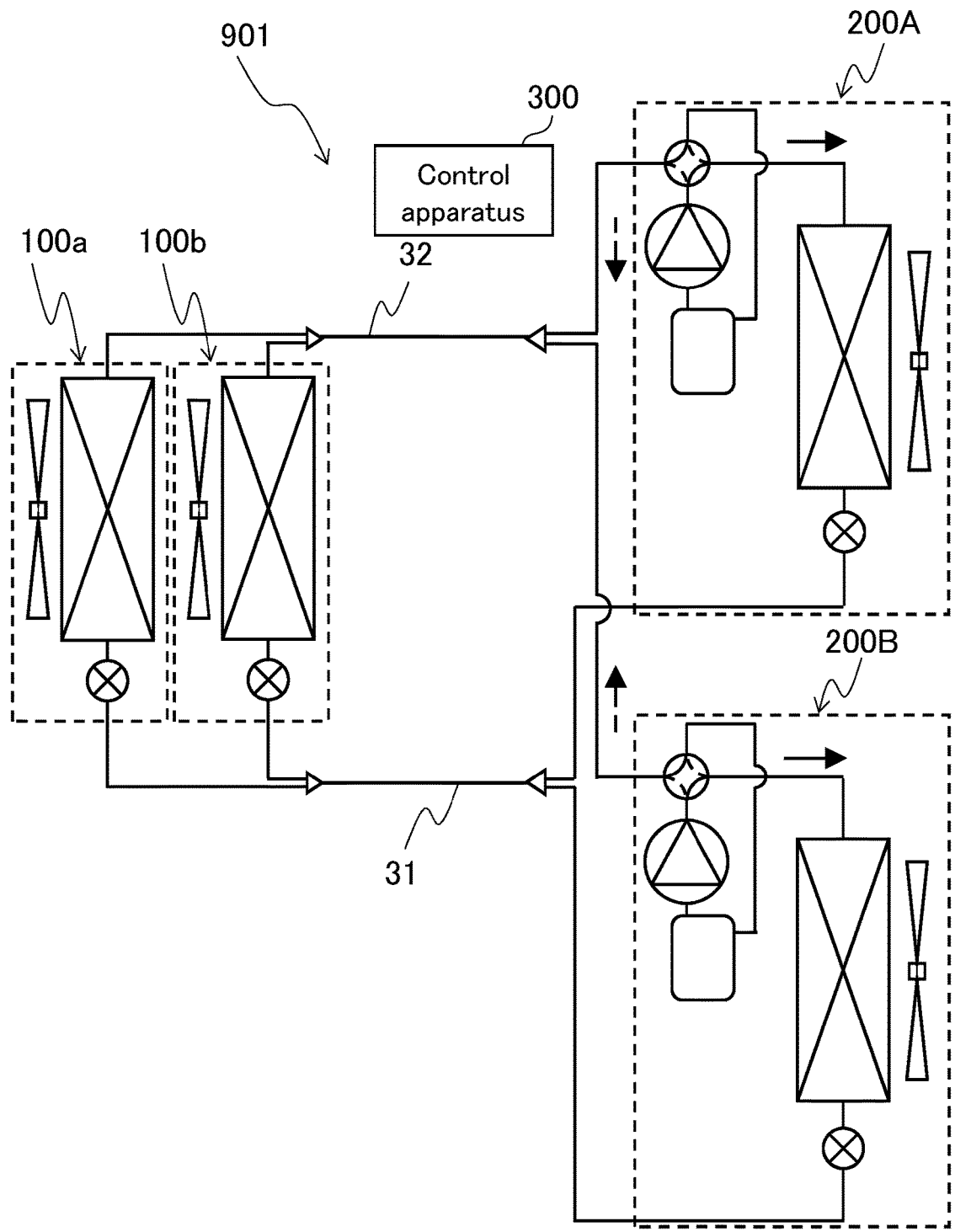
FIG. 2 is a cycle system diagram of an air conditioner according to a modification of the first embodiment.

Moreover, while the air conditioner 900 is constituted by one outdoor unit and one indoor unit, as a modification thereof, a plurality of indoor units may be coupled to one outdoor unit or, as in the case of an air conditioner 901 shown in FIG. 2, a plurality of outdoor units 200A and 200B with a similar configuration to the outdoor unit 200 and a plurality of indoor units 100a and 100b with a similar configuration to the indoor unit 100 may be provided. In addition, the number of sensors may be increased or reduced as necessary. Furthermore, the control apparatus 300 controls a refrigerating cycle constituted by the indoor unit 100 and the outdoor unit 200 based on operations performed using a remote controller and various sensors.

Next, operations of the air conditioner 900 will be described with reference to FIG. 1. In FIG. 1, a solid arrow indicates a flow direction of a refrigerant during a cooling operation and a dashed arrow indicates a flow direction of the refrigerant during a heating operation.

During a cooling operation, the outdoor heat exchanger 21 functions as a condenser and the indoor heat exchanger 11 functions as an evaporator. As indicated by a solid arrow C, the refrigerant is compressed by the compressor 24, and after being discharged in a state of high-pressure high-temperature steam, the refrigerant passes through the four-way valve 26 and condenses by releasing heat to outside air sent by the outdoor fan 23 inside the outdoor heat exchanger 21. In addition, pressure of the refrigerant having assumed a high-pressure medium-temperature liquid state is reduced when passing through the outdoor expansion valve 22 and the indoor expansion valve 12 and the refrigerant changes to a low-pressure low-temperature gas-liquid two-phase state, evaporates by drawing heat from indoor air sent by the indoor fan 13 inside the indoor heat exchanger 11, and changes to a low-pressure low-temperature gaseous state. Furthermore, the gas refrigerant passes through the four-way valve 26 and flows into the accumulator 25, and after a liquid refrigerant not evaporated by the indoor heat exchanger 11 is separated, the gas refrigerant flowing through the U-tube 253 and a mixture of the liquid refrigerant suctioned through the hole 254 provided in the lower part of the U-tube 253 in accordance with a pressure loss generated before the gas refrigerant flowing through the U-tube 253 reaches the hole 254 and a liquid level inside the accumulator 25 and refrigerant oil are suctioned by the compressor 24.

On the other hand, switching flow directions of the refrigerant with the four-way valve 26 realizes a heating operation. In this case, the outdoor heat exchanger 21 functions as an evaporator and the indoor heat exchanger 11 as a condenser. As indicated by a dashed arrow H, the refrigerant circulates inside the air conditioner 900 while undergoing state changes in an order of the compressor 24, the four-way valve 26, the indoor heat exchanger 11, the indoor expansion valve 12, the outdoor expansion valve 22, the outdoor heat exchanger 21, the four-way valve 26, the accumulator 25, and the compressor 24, and absorbs heat from outside air and releases the heat into indoor air.

While a certain amount of refrigerant is generally sealed inside of the outdoor unit 200 at the time of shipment of the air conditioner 900, in the case of a multi-type air conditioner, since a capacity of the indoor unit 100 and lengths of the coupling pipes 31 and 32 differ with every installation, additional sealing of the refrigerant is performed depending on the situation.

Although an air conditioner produces specified cooling and heating performances as long as the refrigerant amount in the refrigerating cycle is within a proper range, when the refrigerant amount is excessive or insufficient, prescribed cooling and heating performances cannot be produced and, in some cases, equipment failure may occur. In addition, a refrigerant cannot always be accurately sealed due to a miscalculation of an additional sealing amount, an error during a sealing operation, and the like.

In consideration thereof, a method (hereinafter, a refrigerant amount determination method) is used which involves performing a test run after installation of the air conditioner 900 and additional sealing of a refrigerant are completed and checking appropriateness of the refrigerant amount in the refrigerating cycle. Hereinafter, a method of refrigerant amount determination according to this embodiment will be described.

Figure 4:
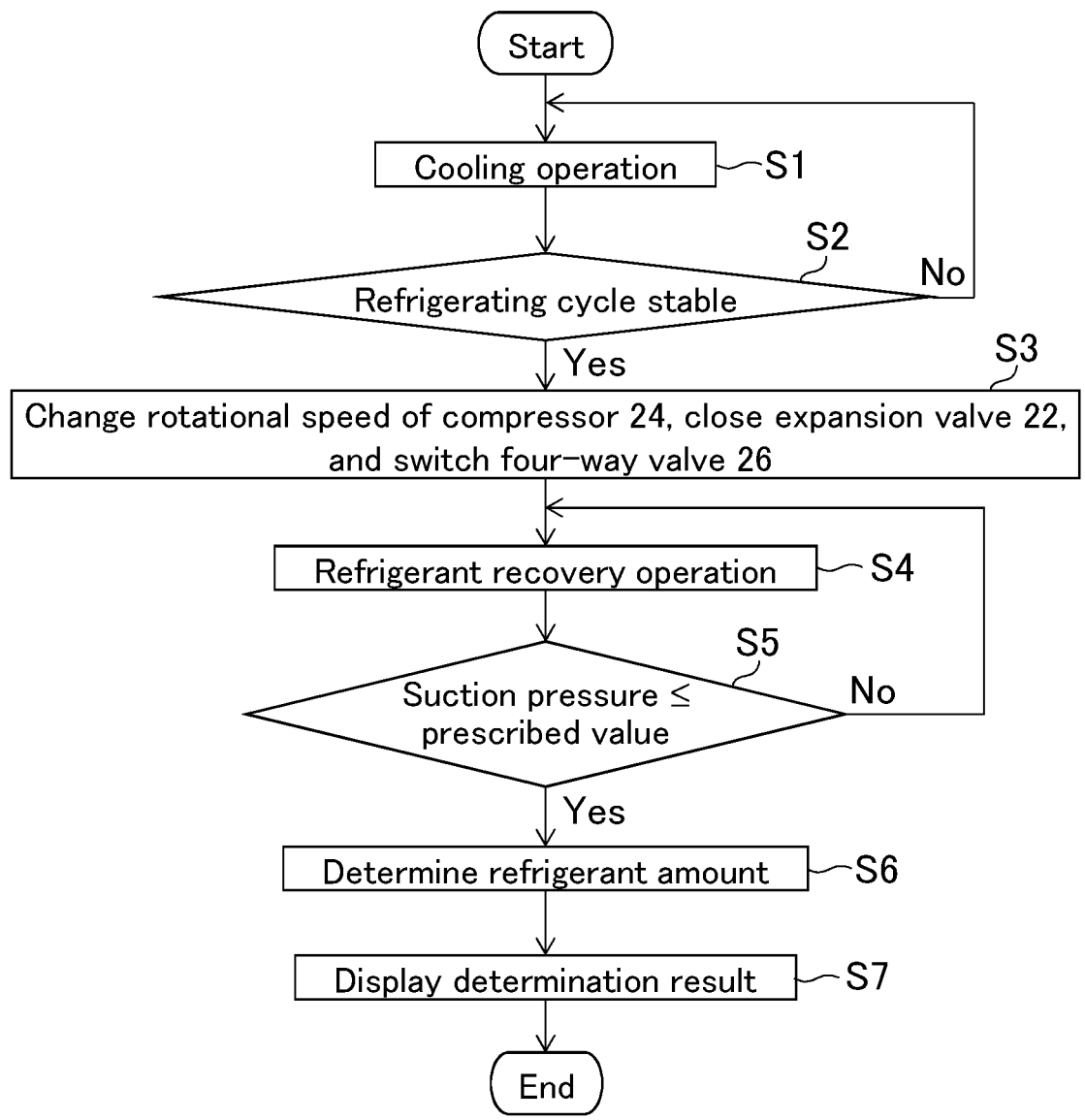
FIG. 4 is a flow chart of a test run for determining appropriateness of a refrigerant amount in a refrigerating cycle according to the first embodiment.

FIG. 4 is a flow chart of a test run for determining the appropriateness of a refrigerant amount in a refrigerating cycle according to the first embodiment. The test run is executed by the control apparatus 300 according to the following process.

<Steps S1 and S2>

After the test run is started, the four-way valve 26 assumes a state indicated by a solid line in FIG. 1, and the compressor 24, the outdoor fan 23, and the indoor fan 13 are started to perform a cooling operation. Rotational speeds of the compressor 24 and the indoor fan 13 and an opening of the outdoor expansion valve 22 are kept constant in order to stabilize the refrigerating cycle, a rotational speed of the outdoor fan 23 is adjusted so that discharge pressure assumes a prescribed value, and the indoor expansion valve 12 is controlled so that a refrigerant temperature change in the indoor heat exchanger 11 or, in other words, a difference between detected values of the temperature sensors 51 and 52 is within a prescribed range. Accordingly, a prescribed amount of the refrigerant passes inside the indoor heat exchanger 11 and the remaining refrigerant passes the outdoor heat exchanger 21 and the like. Therefore, when a sealed refrigerant amount is large, the refrigerant amount flowing through the outdoor heat exchanger 21 and the like is excessive, and when the sealed refrigerant amount is small, the refrigerant amount flowing through the outdoor heat exchanger 21 and the like is insufficient.

Moreover, when a plurality of indoor units or a plurality of outdoor units are provided, all of the units are configured to be operational. In addition, when a plurality of compressors are provided in an outdoor unit, all of the compressors are configured to be operational.

<Step S3>

After the refrigerating cycle stabilizes (step S2: Yes) or, in other words, after the difference between the detected values of the temperature sensors 51 and 52 falls within a prescribed range, the detected value of each sensor is acquired and stored in a memory of the control apparatus 300. In addition, the rotational speed of the compressor 24 is changed and the outdoor expansion valve 22 which is a pressure reducing valve is closed, and after the four-way valve 26 is switched to a state indicated by a dashed line in FIG. 1, a time-count is started.

At this point, the outdoor fan 23 is stopped. While the outdoor fan 23 may be continuously operated, stopping the outdoor fan 23 reduces an effect of outside air temperature and enables a refrigerant amount determination to be performed with higher accuracy. On the other hand, the indoor fan 13 is continuously operated. While the indoor fan 13 may be stopped, continuously operating the indoor fan 13 promotes condensation of the refrigerant performed inside the indoor heat exchanger 11 and prevents discharge pressure of the compressor 24 from rising. In addition, the opening of the indoor expansion valve 12 prior to the start of the refrigerant recovery operation may be maintained, but the indoor expansion valve 12 is fully opened. Furthermore, the rotational speed of the compressor 24 may be configured within an operational range so that differences in recovery times, suction pressure changes, and the like due to a difference in refrigerant amounts in the refrigerating cycle become more apparent. Moreover, the detected value of each sensor is acquired and information necessary for making determinations is stored even during the refrigerant recovery operation.

<Steps S4 and S5>

The compressor 24 is operated at a constant rotational speed until suction pressure or, in other words, the detected value of the pressure sensor 65 reaches a prescribed value, and the refrigerant in the outdoor heat exchanger 21, the refrigerant in the accumulator 25, and the refrigerant in the pipe between the outdoor heat exchanger 21 and the accumulator 25 are recovered and sent to the indoor heat exchanger 11 and the coupling pipes 31 and 32 (hereinafter, referred to as a refrigerant recovery operation). In addition, a determination is made regarding whether or not the suction pressure of the compressor 24 as detected by the pressure sensor 65 has become equal to or fallen below a prescribed value. A suction pressure change and the like of the refrigerant can be accurately detected by operating the compressor 24 at a constant rotational speed.

<Step S6>

When the suction pressure falls below the prescribed value (step S5: Yes), the time-count is ended and the compressor 24 and the indoor fan 13 are stopped. In addition, the appropriateness (proper, insufficient, or excessive) of the refrigerant amount in the refrigerating cycle is determined using the time required for refrigerant recovery (hereinafter, a refrigerant recovery time), a suction pressure change during the refrigerant recovery operation, and the like. A specific determination method will be described later with reference to FIGS. 5 to 9.

At this point, while only measurement results obtained during the refrigerant recovery operation may be used to perform a refrigerant amount determination, the determination may be made comprehensively by referring to an operational state during a period of stability of the refrigerating cycle acquired in (step 2) such as a degree of supercooling at the outlet of the outdoor heat exchanger 21 which functions as a condenser.

<Step S7>

The test run ends by displaying a determination result indicating any of proper, insufficient, and excessive on a display unit of the air conditioner 900.

Next, indices of refrigerant amount determination will be described with reference to FIGS. 5 to 9.

Figure 5:
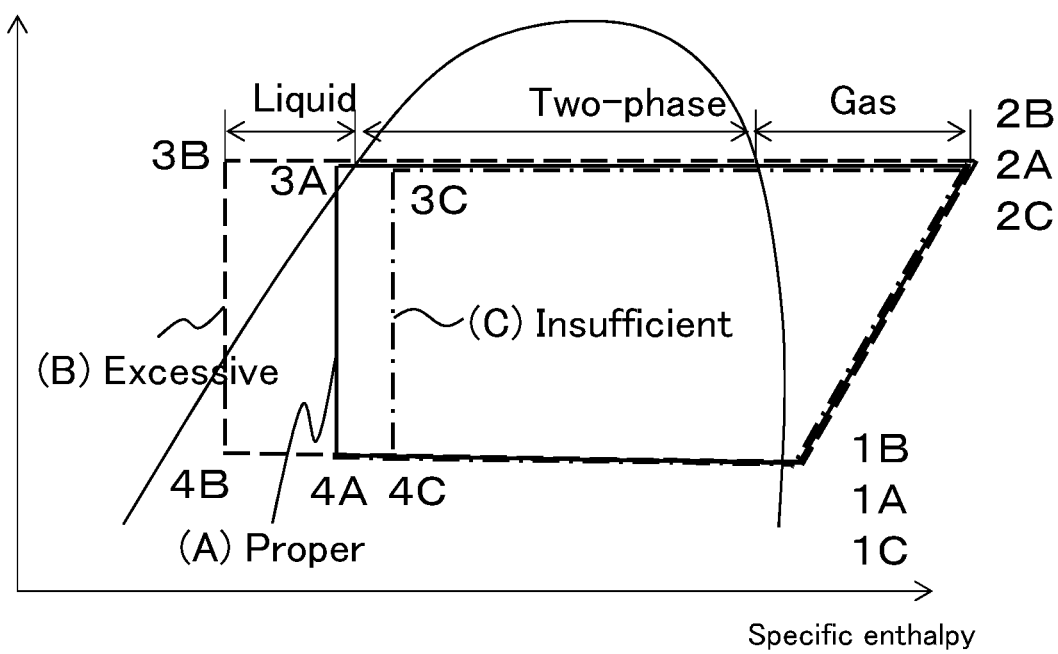
FIG. 5 is a Mollier diagram showing a difference in cycle states during a cooling operation of an air conditioner due to a difference in refrigerant amounts in a refrigerating cycle.

FIG. 5 is a Mollier diagram showing a difference in cycle states during a cooling operation of the air conditioner 900 due to a difference in refrigerant amounts in the refrigerating cycle. In the diagram, a horizontal axis indicates specific enthalpy and a vertical axis indicates refrigerant pressure. In addition, (1-2) represents a compression process in the compressor 24, (2-3) represents a condensation process in the outdoor heat exchanger 21 which functions as a condenser, (3-4) represents a pressure-reducing process in the indoor expansion valve 12, and (4-1) represents an evaporation process in the indoor heat exchanger 11 which functions as an evaporator. Furthermore, a solid line indicates a cycle state (A) when the refrigerant amount in the refrigerating cycle is proper, a dashed line indicates a cycle state (B) when the refrigerant amount is excessive, and a dashed-dotted line indicates a cycle state (C) when the refrigerant amount is insufficient.

Figure 6:
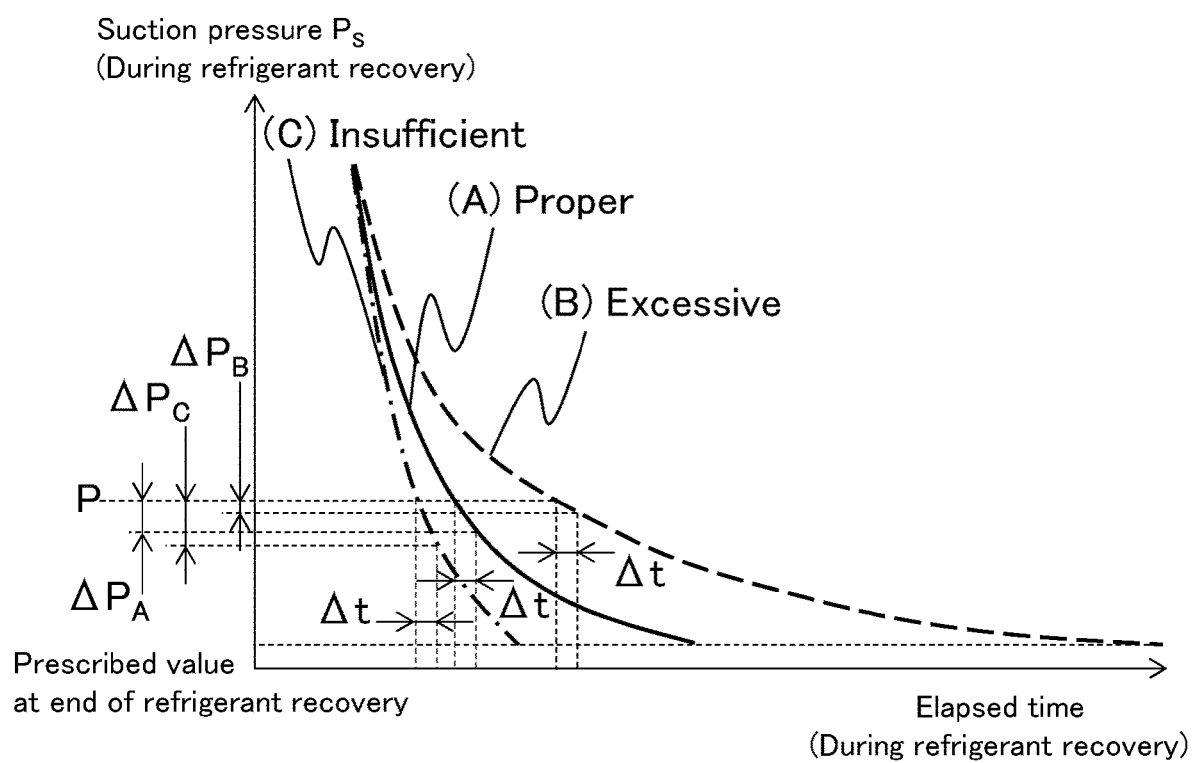
FIG. 6 is a diagram showing a difference in suction pressure changes during a refrigerant recovery operation due to a difference in refrigerant amounts in a refrigerating cycle.

FIG. 6 is a diagram showing a difference in suction pressure changes during a refrigerant recovery operation due to a difference in refrigerant amounts in the refrigerating cycle. In the diagram, a horizontal axis indicates elapsed time from the start of a refrigerant recovery operation, and a vertical axis indicates suction pressure during the refrigerant recovery operation.

Figure 7:
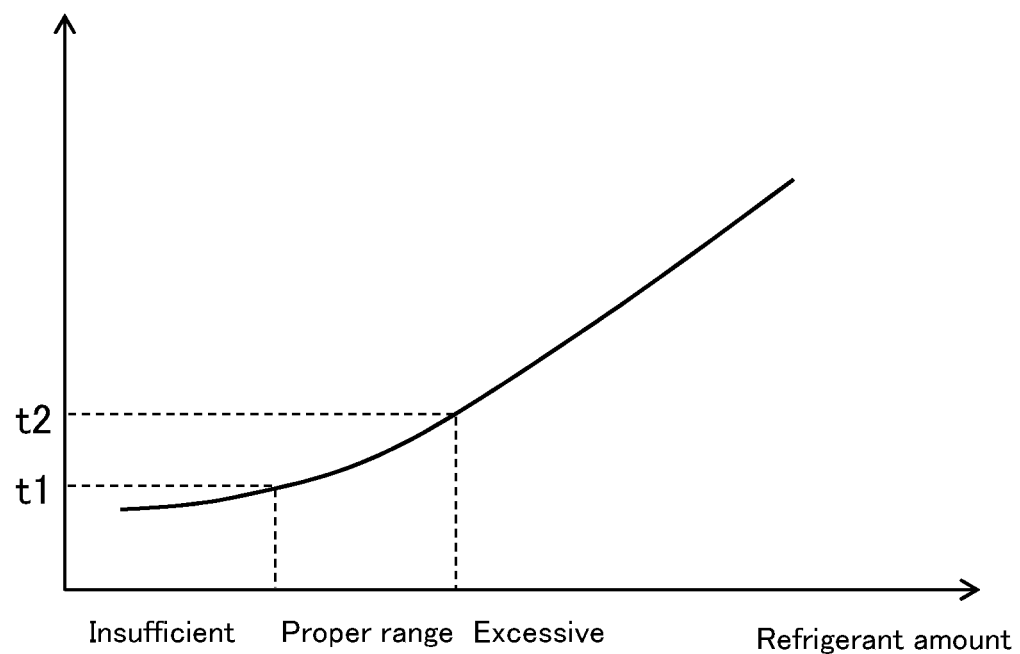
FIG. 7 is a diagram showing a relationship between a refrigerant recovery time and a refrigerant amount in a refrigerating cycle.

FIG. 7 is a diagram showing a relationship between a refrigerant recovery time and a refrigerant amount in the refrigerating cycle. In the diagram, a horizontal axis indicates a refrigerant amount and a vertical axis indicates refrigerant recovery time.

Figure 8:
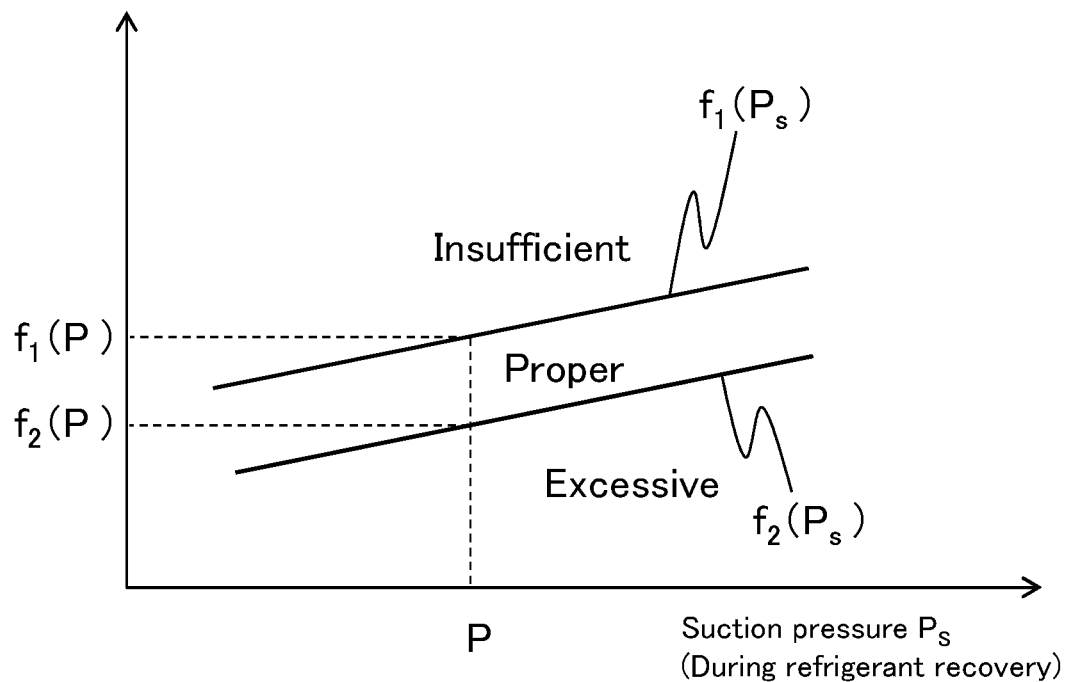
FIG. 8 is a diagram showing a relationship between a suction pressure change and suction pressure during a refrigerant recovery operation which is used for appropriateness determination of a refrigerant amount in a refrigerating cycle.

FIG. 8 is a diagram showing a relationship between a suction pressure change and suction pressure during a refrigerant recovery operation which is used for appropriateness determination of a refrigerant amount in the refrigerating cycle. In the diagram, a horizontal axis indicates suction pressure during a refrigerant recovery operation, and a vertical axis indicates a suction pressure change during the refrigerant recovery operation.

Figure 9:
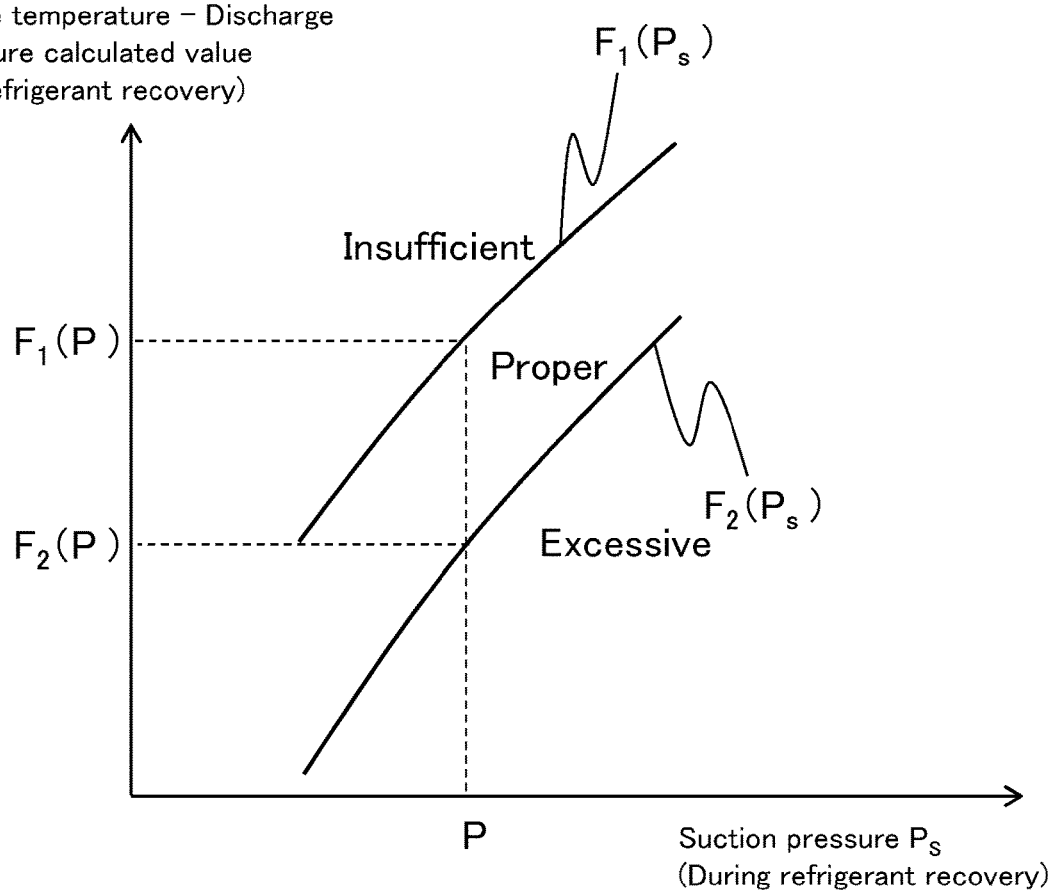
FIG. 9 is a diagram showing a relationship between (discharge temperature–discharge temperature calculated value) and suction pressure during a refrigerant recovery operation which is used for appropriateness determination of a refrigerant amount in a refrigerating cycle.

FIG. 9 is a diagram showing a relationship between (discharge temperature–discharge temperature calculated value) and suction pressure during a refrigerant recovery operation which is used for appropriateness determination of a refrigerant amount in the refrigerating cycle.

As shown in FIG. 5, (B) when the refrigerant amount in the refrigerating cycle is excessive, a larger amount of a liquid refrigerant exists inside the outdoor heat exchanger 21 which functions as a condenser as compared to (A) when the refrigerant amount in the refrigerating cycle is proper. On the other hand, (C) when the refrigerant amount is insufficient, the refrigerant is in a two-phase state even at the outlet of the outdoor heat exchanger 21 and a liquid storage amount is small.

After the outdoor expansion valve 22 is closed and the four-way valve 26 is switched in step S3, a pressure change causes the liquid refrigerant stored in the outdoor heat exchanger 21 to move to the accumulator 25, and an amount of this movement increases in an order of the refrigerant amount in the refrigerating cycle of insufficient, proper, and excessive.

In addition, in the refrigerant recovery operation in step S4, the refrigerant in the outdoor heat exchanger 21, the refrigerant in the accumulator 25, and the refrigerant in the pipe between the outdoor heat exchanger 21 and the accumulator are recovered, and the liquid refrigerant inside the accumulator 25 evaporates as pressure drops. Since the larger the amount of the liquid refrigerant inside the accumulator 25, the larger the amount of gas produced by evaporation, hence as shown in FIG. 6 a decline in suction pressure becomes more gradual in an order of the refrigerant amount of insufficient, proper, and excessive, and more time is required until the refrigerant recovery operation ends or, in other words, until the suction pressure reaches a prescribed value.

Therefore, when a correlation such as that shown in FIG. 7 exists between the refrigerant amount in the refrigerating cycle and the refrigerant recovery time, for example, the refrigerant amount in the refrigerating cycle can be determined to be excessive when the refrigerant recovery time exceeds t2, the refrigerant amount in the refrigerating cycle can be determined to be proper when the refrigerant recovery time is between t1 and t2, and the refrigerant amount in the refrigerating cycle can be determined to be insufficient when the refrigerant recovery time is under t1.

In addition, FIG. 6 reveals that a suction pressure change which occurs within a certain prescribed time $\Delta t$ after suction pressure reaches, for example, P is smaller when the refrigerant amount is excessive ($\Delta P_B$) and larger when the refrigerant amount is insufficient ($\Delta P_C$) than when the refrigerant amount is proper ($\Delta P_A$). On the other hand, when the refrigerant amount in the refrigerating cycle is within a proper range, a suction pressure change which occurs within a prescribed time $\Delta t$ during a refrigerant recovery operation is between $f_1(P_s)$ and $f_2(P_s)$ shown in FIG. 8. In this case, $f_1(P_s)$ and $f_2(P_s)$ are functions between suction pressure and suction pressure change which are obtained by a test or a simulation and stored in the memory of the control apparatus 300.

Therefore, the appropriateness of the refrigerant amount in the refrigerating cycle can be determined by comparing the suction pressure change with $f_1(P_s)$ and $f_2(P_s)$. For example, the refrigerant amount in the refrigerating cycle can be determined to be excessive when the suction pressure change which occurs within a certain prescribed time $\Delta t$ after suction pressure reaches P is under $f_2(P)$, the refrigerant amount in the refrigerating cycle can be determined to be proper when the suction pressure change is between $f_2(P)$ and $f_1(P)$, and the refrigerant amount in the refrigerating cycle can be determined to be insufficient when the suction pressure change exceeds $f_1(P)$.

Moreover, since the difference in suction pressure changes due to a difference in refrigerant amounts is more apparent when the suction pressure is low, determination accuracy can be increased by performing a refrigerant amount determination when the suction pressure is low.

Furthermore, the refrigerant suctioned by the compressor 24 is constituted by the gas refrigerant flowing through the U-tube 253 of the accumulator 25 and a mixture of the liquid refrigerant suctioned through the hole 254 provided in the lower part of the U-tube 253 in accordance with a pressure loss generated before the gas refrigerant flowing through the U-tube 253 reaches the hole 254 and a liquid level inside the accumulator 25 and refrigerant oil. As a result, since the larger the amount of the liquid refrigerant inside the accumulator 25, the higher the liquid level, a proportion of the liquid included in the refrigerant suctioned by the compressor 24 increases and temperature at the time of discharge (hereinafter, a discharge temperature) drops.

However, the discharge temperature is not only affected by a refrigerant state when suctioned by the compressor 24 but is also affected by discharge pressure and a compression ratio. Therefore, by obtaining a correlation between the discharge temperature when dryness of suctioned refrigerant is at a prescribed value and the discharge pressure and the compression ratio, and using a difference between a calculated value based on the correlation (hereinafter, a discharge temperature calculated value) and the discharge temperature, a state of the refrigerant suctioned by the compressor 24 can be evaluated under all operating conditions.

During a refrigerant recovery operation, since the amount of the liquid refrigerant inside the accumulator 25 increases in an order of the refrigerant amount in the refrigerating cycle of insufficient, proper, and excessive as described earlier, (discharge temperature–discharge temperature calculated value) declines. On the other hand, when the refrigerant amount in the refrigerating cycle is within a proper range, (discharge temperature–discharge temperature calculated value) is between $F_1(P_s)$ and $F_2(P_s)$ shown in FIG. 9. In this case, $F_1(P_s)$ and $F_2(P_s)$ are functions between suction pressure and (discharge temperature–discharge temperature calculated value) which are obtained by a test or a simulation and stored in the memory of the control apparatus 300.

Therefore, the appropriateness of the refrigerant amount in the refrigerating cycle can be determined by comparing (discharge temperature–discharge temperature calculated value) with $F_1(P_s)$ and $F_2(P_s)$. For example, the refrigerant amount in the refrigerating cycle can be determined to be excessive when (discharge temperature–discharge temperature calculated value) detected when the suction pressure equals P is under $F_2(P)$, the refrigerant amount in the refrigerating cycle can be determined to be proper when (discharge temperature–discharge temperature calculated value) detected when the suction pressure equals P is between $F_1(P)$ and $F_2(P)$, and the refrigerant amount in the refrigerating cycle can be determined to be insufficient when (discharge temperature–discharge temperature calculated value) detected when the suction pressure equals P exceeds $F_1(P)$.

Moreover, since the difference in (discharge temperature–discharge temperature calculated value) due to a difference in refrigerant amounts is more apparent when the suction pressure is low, determination accuracy can be further increased by performing a refrigerant amount determination when the suction pressure is equal to or lower than a certain level. In addition, while discharge temperature is used in this case, a degree of discharge superheat may be used instead.

According to the present embodiment, since the appropriateness of the refrigerant amount in the refrigerating cycle can be accurately determined, faults due to excess and deficiency in the refrigerant amount can be prevented and reliability of the air conditioner 900 can be improved. In addition, since a refrigerant amount determination can be performed automatically, special skills are not required and even an inexperienced worker can readily determine the appropriateness of the refrigerant amount with accuracy. Furthermore, since only a small number of sensors are used for refrigerant amount determination and sensors need not be newly installed, high determination accuracy can be obtained by reducing detection error without increasing cost.

In addition, a determination of the refrigerant amount may be performed based on at least any one of indices including a refrigerant recovery time, a suction pressure change, and discharge temperature. When a determination is to be made using a plurality of indices, a priority order of the indices may be determined in advance, or when a determination is to be made using three indices, a priority order of the indices may be determined by majority. Furthermore, when a determination is to be made solely based on a suction pressure change or discharge temperature, time need not be counted in step S3 and the determination of the refrigerant amount in step S6 may be made after a prescribed time lapses after switching the four-way valve 26 instead of upon suction pressure becoming equal to or falling below a prescribed value.

Next, an air conditioner according to a second embodiment will be described with reference to FIG. 10.

The air conditioner according to the present embodiment is the same as the air conditioner 900 according to the first embodiment.

Figure 10:
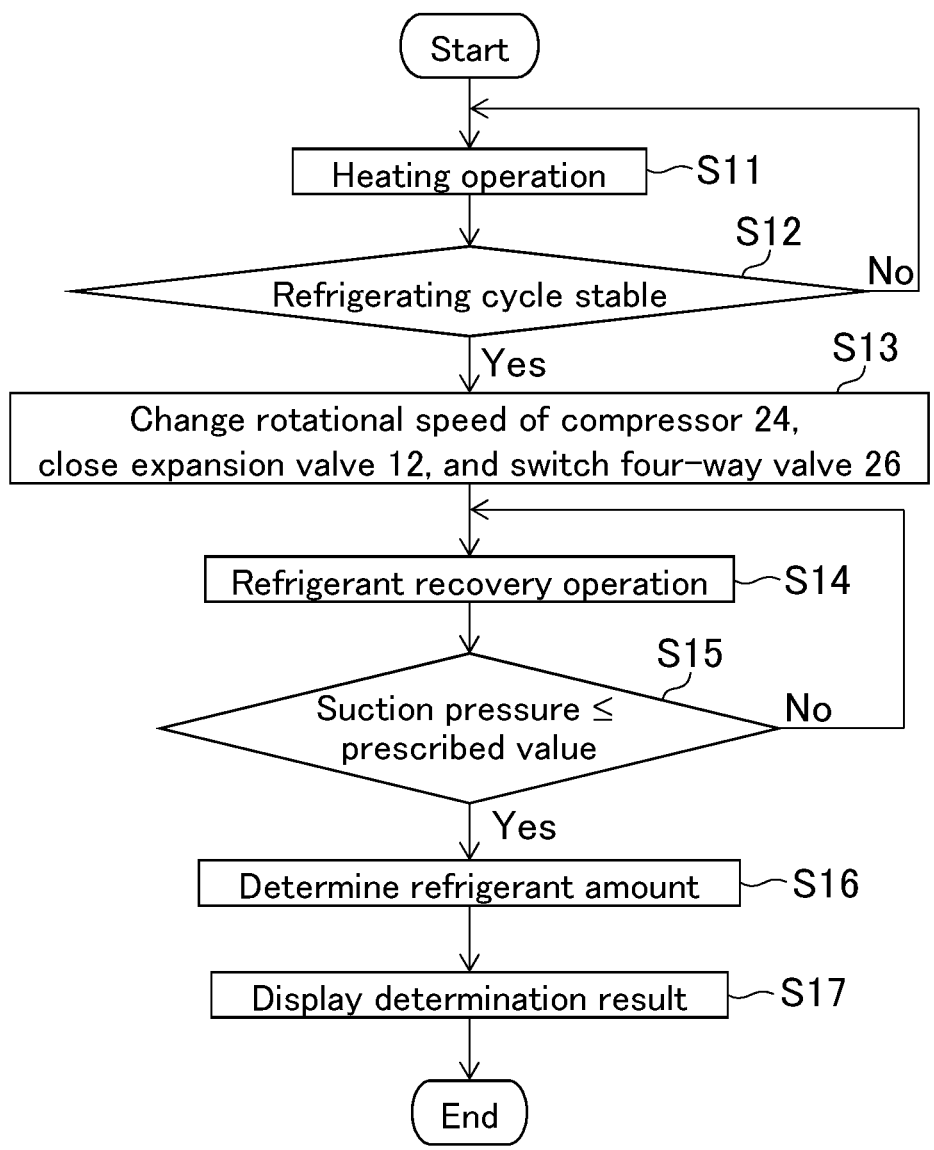
FIG. 10 is a flow chart of a test run for determining appropriateness of a refrigerant amount in a refrigerating cycle according to a second embodiment.

FIG. 10 is a flow chart of a test run for determining the appropriateness of a refrigerant amount in a refrigerating cycle according to the second embodiment. The test run is executed by the control apparatus 300 according to the following process.

<Steps S11 and S12>

After a test run is started, the four-way valve 26 assumes a state indicated by the dashed line in FIG. 1, and the compressor 24, the outdoor fan 23, and the indoor fan 13 are started to perform a heating operation. Rotational speeds of the compressor 24 and the outdoor fan 23 and an opening of the indoor expansion valve 12 are kept constant in order to stabilize the refrigerating cycle, a rotational speed of the indoor fan 13 is adjusted so that discharge pressure is within a prescribed range, and the outdoor expansion valve 22 is controlled so that a refrigerant temperature change in the outdoor heat exchanger 21 or, in other words, a difference between detected values of the temperature sensors 62 and 63 is within a prescribed range. Accordingly, a prescribed amount of the refrigerant passes inside the outdoor heat exchanger 21 and the remaining refrigerant passes the indoor heat exchanger 11 and the like. Therefore, when a sealed refrigerant amount is large, the refrigerant amount flowing through the indoor heat exchanger 11 and the like is excessive, and when the sealed refrigerant amount is small, the refrigerant amount flowing through the indoor heat exchanger 11 and the like is insufficient.

Moreover, when a plurality of indoor units or a plurality of outdoor units are provided, all of the units are configured to be operational. In addition, when a plurality of compressors are provided in an outdoor unit, all of the compressors are configured to be operational.

<Step S13>

After the refrigerating cycle stabilizes (step S12: Yes) or, in other words, after the difference between the detected values of the temperature sensors 62 and 63 falls within a prescribed range, the detected value of each sensor is acquired and stored in the memory of the control apparatus 300. In addition, the rotational speed of the compressor 24 is changed and the indoor expansion valve 12 is closed, and after the four-way valve 26 is switched to a state indicated by the solid line in FIG. 1, a time-count is started.

At this point, the indoor fan 13 is stopped. While the indoor fan 13 may be continuously operated, stopping the indoor fan 13 reduces an effect of indoor temperature and enables a refrigerant amount determination to be performed with higher accuracy. On the other hand, the outdoor fan 23 is continuously operated. While the outdoor fan 23 may be stopped, continuously operating the outdoor fan 23 promotes condensation of the refrigerant performed inside the outdoor heat exchanger 21 and prevents discharge pressure of the compressor 24 from rising. In addition, while the opening of the outdoor expansion valve 22 prior to the start of the refrigerant recovery operation may be maintained, the outdoor expansion valve 22 may be fully opened. Furthermore, the rotational speed of the compressor 24 may be configured within an operational range so that differences in recovery times, suction pressure changes, and the like due to a difference in refrigerant amounts in the refrigerating cycle become more apparent. Moreover, the detected value of each sensor is acquired and information necessary for making determinations is stored even during the refrigerant recovery operation.

<Steps S14 and S15>

The compressor 24 is operated at a constant rotational speed until suction pressure or, in other words, the detected value of the pressure sensor 65 reaches a prescribed value, and the refrigerant in the indoor heat exchanger 11, the refrigerant in the accumulator 25, and the refrigerant in the pipe between the indoor heat exchanger 11 and the accumulator 25 are recovered and sent to the outdoor heat exchanger 21 and the coupling pipe 31 (hereinafter, referred to as a refrigerant recovery operation). In addition, a determination is made regarding whether or not the suction pressure of the compressor 24 as detected by the pressure sensor 65 has become equal to or fallen below a prescribed value.

<Step S16>

When the suction pressure falls below the prescribed value (step S15: Yes), the time-count is ended and the compressor 24 and the outdoor fan 23 are stopped. In addition, the appropriateness of the refrigerant amount in the refrigerating cycle is determined using the time required for refrigerant recovery (hereinafter, a refrigerant recovery time), a suction pressure change during the refrigerant recovery operation, and the like. Since a specific determination method is the same as the method described with reference to FIGS. 5 to 9 in the first embodiment, a description will be omitted here.

At this point, while only measurement results obtained during the refrigerant recovery operation may be used to perform a refrigerant amount determination, the determination may be made comprehensively by referring to an operational state during a period of stability of the refrigerating cycle acquired in (step 2) such as a degree of supercooling at the outlet of the indoor heat exchanger 11 which functions as a condenser.

<Step S17>

The test run ends by displaying a determination result indicating any of proper, insufficient, and excessive on a display unit of the air conditioner 900.

According to the present embodiment, the appropriateness of the refrigerant amount in the refrigerating cycle can be determined with high accuracy even under conditions in which it is difficult to perform a cooling operation.

Next, an air conditioner according to a third embodiment will be described with reference to FIGS. 11 and 12.

Hereinafter, same components as those of the first embodiment will be assigned same reference signs and a description thereof will be omitted, and differences from the first embodiment will be mainly described.

Figure 11:
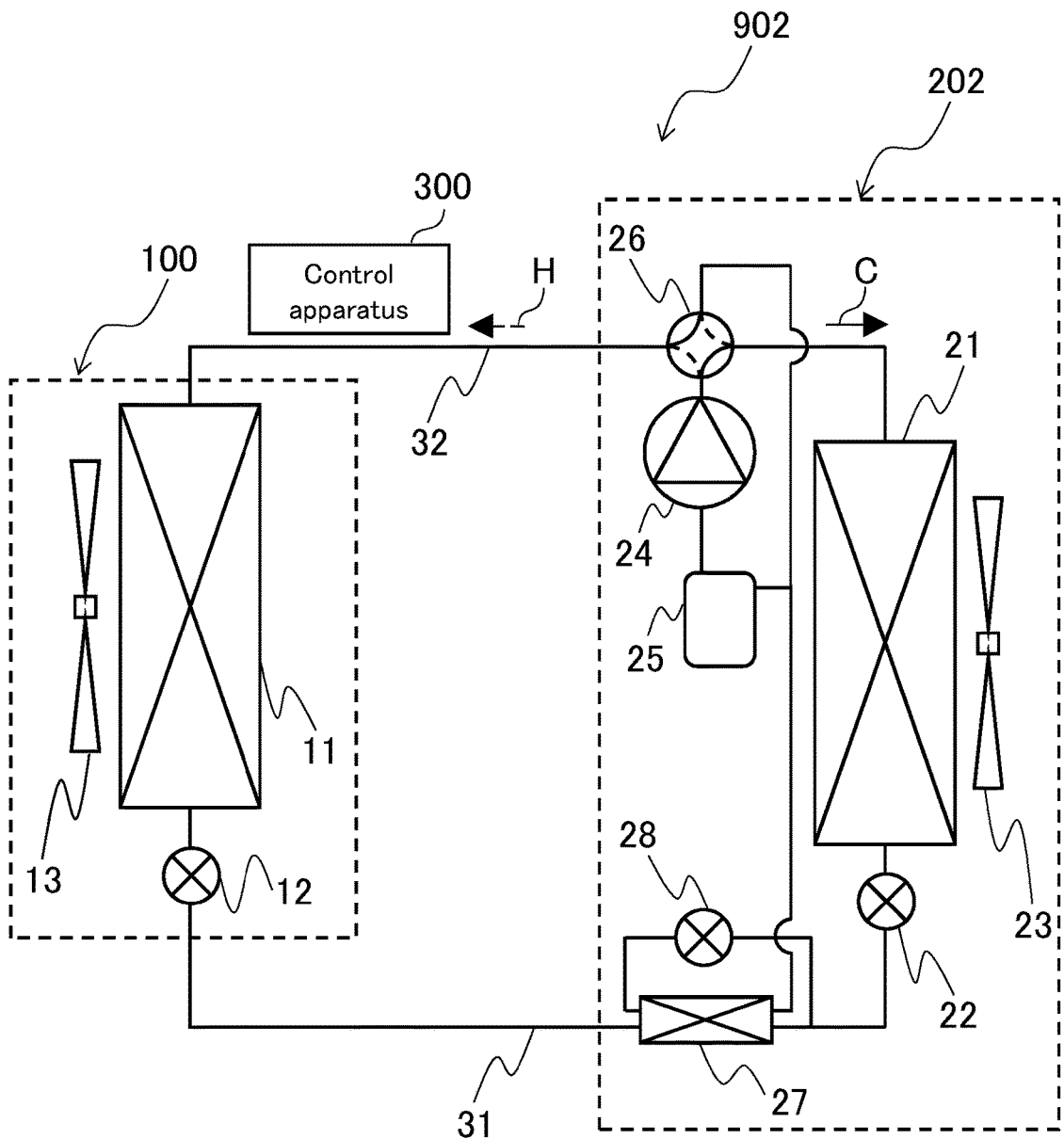
FIG. 11 is a cycle system diagram of an air conditioner according to a third embodiment.

FIG. 11 shows a cycle system diagram of an air conditioner 902 according to the present embodiment.

The air conditioner 902 is provided with the indoor unit 100, an outdoor unit 202, and the pipes 31 and 32 which couple the indoor unit 100 and the outdoor unit 202 to each other.

The outdoor unit 202 is provided with the outdoor heat exchanger 21 which exchanges heat between a refrigerant and outside air, the outdoor expansion valve 22 which reduces pressure of the refrigerant, the outdoor fan 23 which supplies outside air to the outdoor heat exchanger 21, the compressor 24 which compresses the refrigerant, the accumulator 25 which separates and stores a liquid refrigerant not evaporated by an evaporator, the four-way valve 26 which switches flow directions of the refrigerant, a supercooling heat exchanger 27 which bypasses a part of the refrigerant from the condenser and which exchanges heat between the bypassed part and a main flow, and an expansion valve 28 which reduces pressure of the bypassed refrigerant. Moreover, although not illustrated, the air conditioner 902 according to the present embodiment is provided with sensors similar to those included in the air conditioner 900.

During a cooling operation, the outdoor heat exchanger 21 functions as a condenser and the indoor heat exchanger 11 functions as an evaporator. As indicated by a solid arrow C, the refrigerant is compressed by the compressor 24, and after being discharged in a state of high-pressure high-temperature steam, the refrigerant passes through the four-way valve 26 and condenses by releasing heat to outside air sent by the outdoor fan 23 inside the outdoor heat exchanger 21. In addition, in the refrigerant having assumed a high-pressure medium-temperature liquid state, a part thereof diverges and, after pressure of the diverged part is reduced by the expansion valve 28, the diverged part exchanges heat with a main flow inside the supercooling heat exchanger 27, changes into a low-pressure medium-temperature gaseous state, and flows to the accumulator 25. On the other hand, pressure of the main flow of the refrigerant is reduced by the outdoor expansion valve 22 and, after the main flow passes through the supercooling heat exchanger 27, pressure of the main flow is reduced by the indoor expansion valve 12 and the main flow changes to a low-pressure low-temperature gas-liquid two-phase state, evaporates by drawing heat from indoor air sent by the indoor fan 13 inside the indoor heat exchanger 11, and changes to a low-pressure low-temperature gaseous state. Furthermore, the gas refrigerant passes through the four-way valve 26 and flows into the accumulator 25, and after a liquid refrigerant not evaporated by the indoor heat exchanger 11 is separated, the gas refrigerant flowing through the U-tube 253 and a mixture of the liquid refrigerant suctioned through the hole 254 provided in the lower part of the U-tube 253 in accordance with a pressure loss generated before the gas refrigerant flowing through the U-tube 253 reaches the hole 254 and a liquid level inside the accumulator 25 and refrigerant oil are suctioned by the compressor 24.

On the other hand, switching flow directions of the refrigerant with the four-way valve 26 realizes a heating operation. In this case, the outdoor heat exchanger 21 functions as an evaporator and the indoor heat exchanger 11 as a condenser. As indicated by a dashed arrow H, the refrigerant circulates inside the air conditioner 902 while undergoing state changes in an order of the compressor 24, the four-way valve 26, the indoor heat exchanger 11, the indoor expansion valve 12, the supercooling heat exchanger 27, the outdoor expansion valve 22, the outdoor heat exchanger 21, the four-way valve 26, the accumulator 25, and the compressor 24, and absorbs heat from outside air and releases the heat into indoor air.

FIG. 12 shows a flow chart of a test run for determining the appropriateness of a refrigerant amount in a refrigerating cycle according to the third embodiment.

The flow chart in FIG. 12 only differs from the flow chart of the test run according to the first embodiment shown in FIG. 4 in the process performed in step S3. Specifically, the expansion valve 28 is closed in addition to changing the rotational speed of the compressor 24, closing the indoor expansion valve 12, and switching the four-way valve 26. Therefore, even in the air conditioner 902, only the refrigerant in the outdoor heat exchanger 21, the refrigerant in the accumulator 25, and the refrigerant in the pipe between the outdoor heat exchanger 21 and the accumulator 25 are recovered in (step S4) and a refrigerant amount determination can be made by a similar method to the first embodiment.

It should be noted that the present disclosure is not limited to the embodiments described above. Various additions, modifications, and the like of the present disclosure will occur to those skilled in the art without departing from the scope of the present disclosure.

What is claimed is:

1. An air conditioner, comprising:
   a refrigerating cycle including a compressor, an outdoor heat exchanger, an indoor heat exchanger, a pressure reducing valve provided between the outdoor heat exchanger and the indoor heat exchanger, and a selector valve configured to switch a flow direction of refrigerant discharged from the compressor; and
   a controller configured to control the refrigerating cycle, wherein the controller is configured to:
      stop a cooling operation or a heating operation;
      set the pressure reducing valve to a fully-closed state and simultaneously switch the selector valve to change a direction in which the refrigerant flows to an opposite direction;
      operate the compressor to perform a refrigerant recovery operation in which refrigerant contained in one of the outdoor heat exchanger and the indoor heat exchanger is recovered by the other of the outdoor heat exchanger and the indoor heat exchanger;
      determine whether an amount of refrigerant in the refrigerating cycle is within a predetermined range based on at least one of a time required for recovery of the refrigerant by the other of the outdoor heat exchanger and the indoor heat exchanger, a pressure change in the refrigerant suctioned by the compressor, and a temperature of the refrigerant discharged from the compressor during the refrigerant recovery operation; and
      during the refrigerant recovery operation, rotate the outdoor fan or the indoor fan supplying air to the other of the outdoor heat exchanger and the indoor heat exchanger storing the recovered refrigerant.

2. The air conditioner according to claim 1, wherein the controller is configured to determine whether the amount of refrigerant in the refrigerating cycle is within the predetermined range based on the time required for recovery of the refrigerant by the other of the outdoor heat exchanger and the indoor heat exchanger, which is a time required for suction pressure of the compressor to equal or fall below a prescribed value after switching the selector valve.

3. The air conditioner according to claim 1, wherein one of the outdoor heat exchanger and the indoor heat exchanger from which the refrigerant is recovered is the outdoor heat exchanger or the indoor heat exchanger having functioned as a condenser in the cooling operation or the heating operation.

4. The air conditioner according to claim 1, further comprising:
   an outdoor fan configured to supply air to the outdoor heat exchanger; and an indoor fan configured to supply air to the indoor heat exchanger, wherein
   the controller is configured to, during the refrigerant recovery operation, stop the outdoor fan or the indoor fan supplying air to one of the outdoor heat exchanger and the indoor heat exchanger from which the refrigerant is recovered.

5. The air conditioner according to claim 1, further comprising:
   a supercooling heat exchanger provided between the outdoor heat exchanger and the indoor heat exchanger and having an expansion valve, wherein
   the controller is configured to set the expansion valve to a fully-closed state during the refrigerant recovery operation.

6. The air conditioner according to claim 1, wherein the controller is configured to operate the compressor at a constant rotational speed during the refrigerant recovery operation.

* * * * *